Feb. 11, 1936.   B. NEAL   2,030,759
COMPRESSOR UNIT
Filed Jan. 9, 1934    3 Sheets-Sheet 2

INVENTOR.
Bob Neal
BY
ATTORNEY.

Feb. 11, 1936.    B. NEAL    2,030,759
COMPRESSOR UNIT
Filed Jan. 9, 1934    3 Sheets-Sheet 3

INVENTOR.
Bob Neal
BY
ATTORNEY.

Patented Feb. 11, 1936

2,030,759

UNITED STATES PATENT OFFICE 2,030,759

COMPRESSOR UNIT

Bob Neal, Arkadelphia, Ark.

Application January 9, 1934, Serial No. 705,964

1 Claim. (Cl. 230—187)

The invention relates to a compressor construction, and more particularly to a combination fluid operated engine and compressor.

The primary object of the invention is the provision of a compressor of this character, wherein there is arranged an automatically counterbalanced crank shaft and fluid equalizers within a storage tank, which makes it possible for the said engine to operate on constant reserve tank pressure so as to actuate additional equipment, the pistons for the engine being also automatically balanced and suspended when the said engine is in operation.

Another object of the invention is the provision of an engine of this character, wherein the same is operated from air under pressure, the said air being supplied by compressors, these being in bank with the engine construction.

A further object of the invention is the provision of an engine of this character, wherein the same is of novel construction, as the engine proper and the compressors are operated from the same crank shaft which is of the automatically balanced type, so that high efficiency is attained.

A still further object of the invention is the provision of an engine of this character, which is comparatively simple in construction, thoroughly reliable and efficient in its operation, strong, durable, and inexpensive to manufacture.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 5 is an enlarged sectional view through one of the electric heaters for the engine.

Similar reference characters indicate corresponding parts throughout the several views in the drawings.

Figure 1:
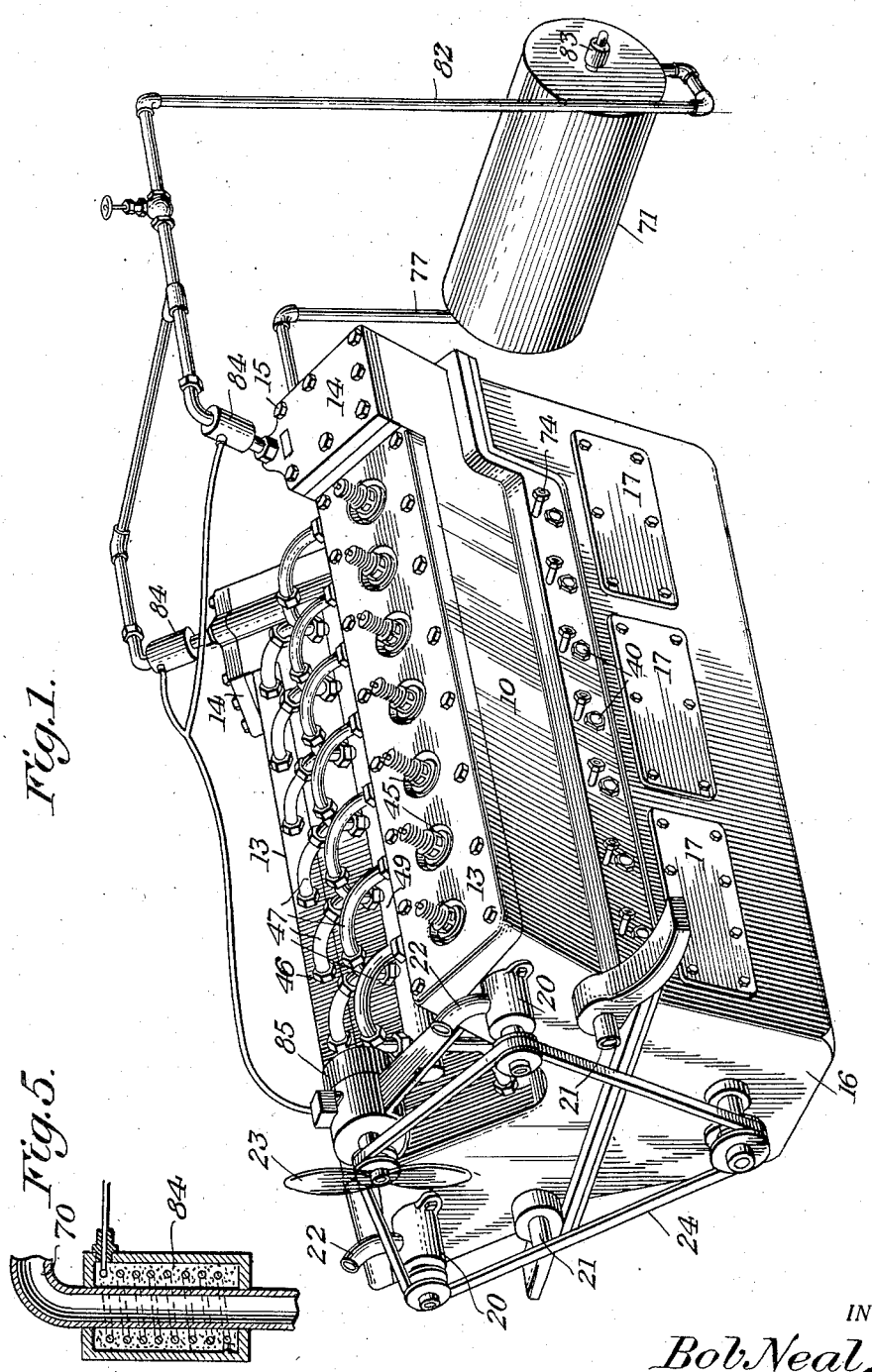
Figure 1 is a perspective view of the engine constructed in accordance with the invention.
Figure 2:
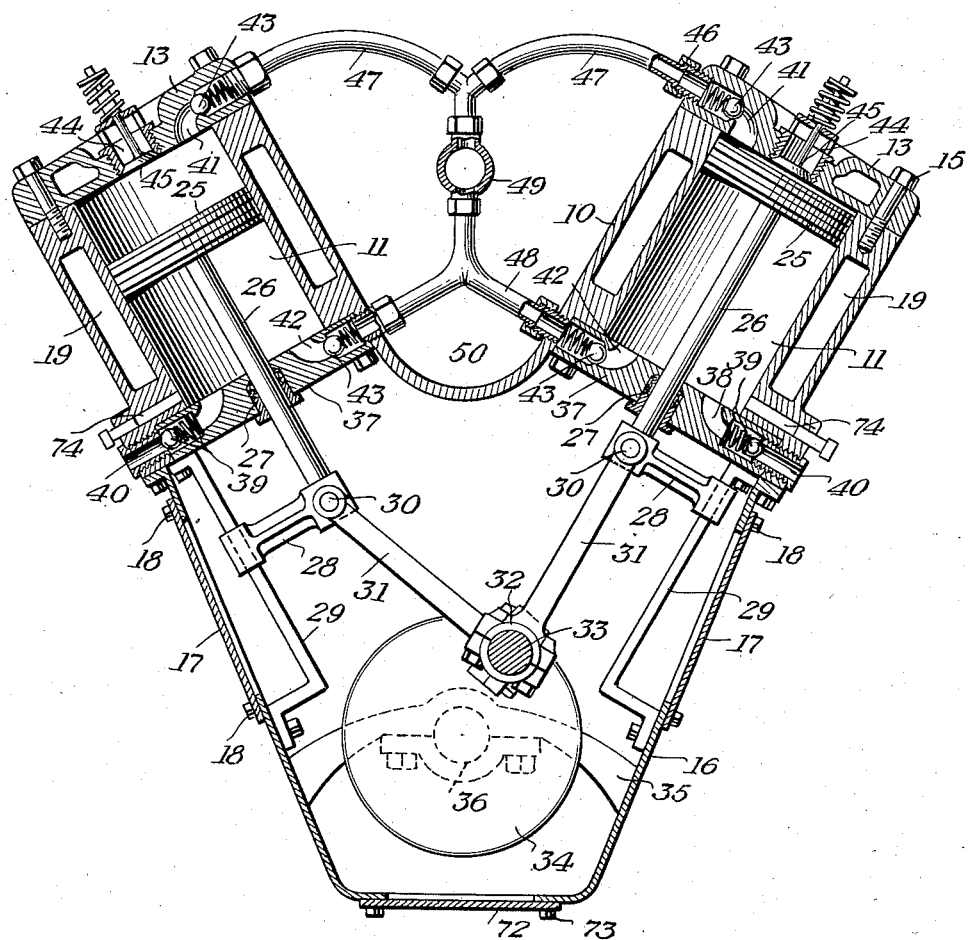
Figure 2 is a vertical transverse sectional view through the compressor part of the engine.
Figure 4:
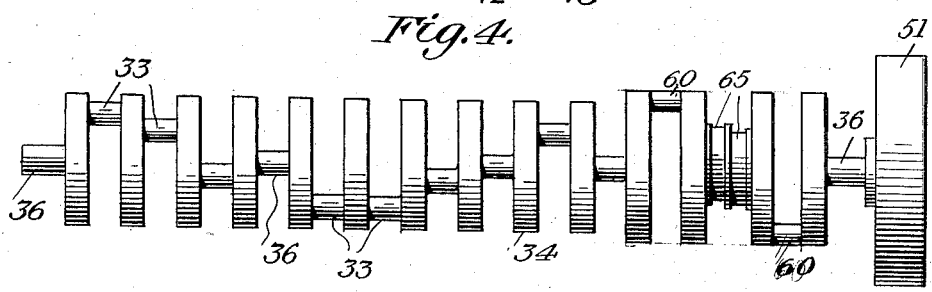
Figure 4 is a detail elevation of the crank shaft of the engine.
Figure 3:
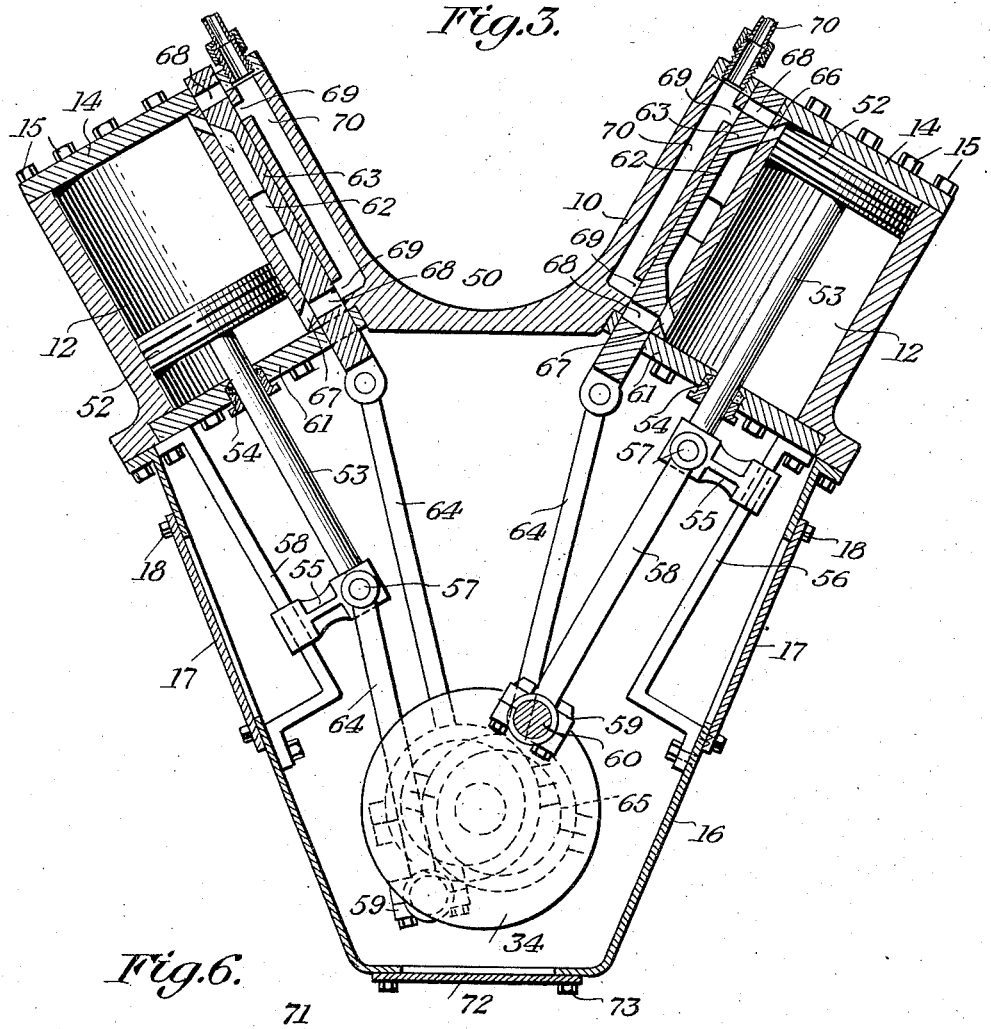
Figure 3 is a vertical sectional view through the power part of the engine.
Figure 6:
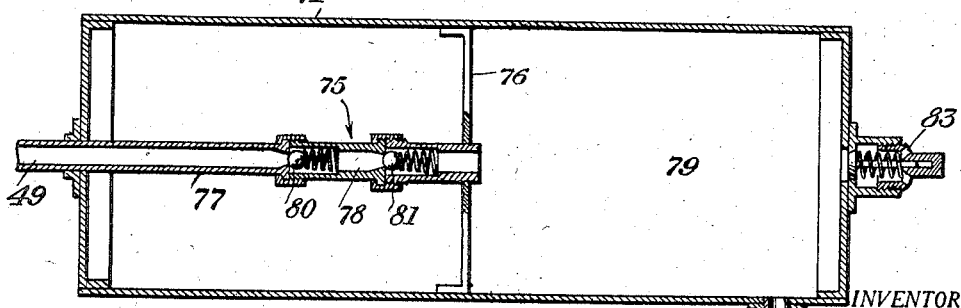
Figure 6 is a vertical longitudinal sectional view through the air storage tank including the equalizer.

Referring to the drawings in detail the engine in its entirety comprises a cylinder block 10 having formed therein the series of compressor cylinders 11 and the power cylinders 12, respectively, the block 10 being of the V-type and closing the upper ends of said cylinders are the removable heads 13 and 14, respectively, which are secured in place by head bolts 15, as is conventional. Beneath the block 10 is the crank case 16, which at opposite sides carries the detachable plates 17, these being held in place by fasteners 18 and such plates are seated so as to be leak proof. The block 10 is chambered to provide a water jacket 19 about the cylinders, while at the forward end of the said water block are water pumps 20 circulating water through the inlet pipe 21 which leads into the jacket and letting said water out therefrom through the outlet pipe 22 leading from said water jacket. Next to the pumps 20 is a fan 23 operated from a belt 24 which also drives the pumps.

Working within the cylinders 11 are the reciprocating pistons 25, their rods 26 being slidable through packing glands 27 and fixed to crossheads 28, which are slidably mounted upon guides 29 secured within the crank case 16 to opposite side walls thereof. These crossheads 28 are fitted with wrist pins 30 pivotally connecting therewith the connecting rods 31 which by the bearings 32 are engaged with their cranks 33 of a counter balanced crank shaft 34, which is mounted in supports 35 arranged in the crank case 16, the shaft being supplied with the required bearings 36.

The inner ends of the cylinders 11 are fitted with inner end heads 37, which are provided with air intake ports 38, these being fitted with spring ball inlet checks 39, the air having admission through passages 40 opening exteriorly of the block 10. The glands 27 are associated with the heads 37.

The heads 13 and 37 are provided with compressed air outlets 41 and 42, respectively, these being fitted with spring ball checks 43, the heads 13 being also provided with the central air inlets 44, which are fitted with spring checks 45. By couplings 46 are attached to the air outlets 41 and 42 the outlet feed pipes 47 and 48, respectively, these leading to a main conduit 49 located in the center channel 50 in said block 10.

At the rear end of the block 10 and on the shaft 34 is the fly wheel 51, this being of conventional type.

Working within the cylinders 12 are pistons 52, their rods 53 sliding through packing glands 54 and fixed in crossheads 55 slidably mounted upon guides 56 which are secured within the crank case 16 at opposite side walls thereof. The crossheads 55 carry wrist pins 57 connecting therewith connecting rods 58, these being engaged by bearings 59 with their respective cranks 60 of the crank shaft 34, the inner ends of the cylinders 12 being also closed by inner heads 61 with which are associated the glands 54.

On the cylinders 12 are slide valve chests 62 in which are the slide valves 63, these being operated by throw rods 64 actuated by cams 65 and such valves controlling the air admission and exhaust of air to and from the cylinders 12 through the ports 66 and 67, and these valves 63 are provided with the ports 68 for the delivery of air under pressure from the inlet passages 69 common to a lead 70 from a compressed air storage tank 71.

The bottom of the crank case 16 is fitted with a removable plate 72 which is secured in place by fasteners 73, and when this plate is removed access can be had to the crank shaft 34 and the bearings for the engine, as well as other parts within said crank case, as should be obvious.

Leading into the cylinders 11 are the passages 74 of a lubricating system (not shown).

The storage tank 71 for the compressed air includes therein a double check discharge nozzle 75, this being supported by a member 76 and leading to this equalizer is an air inlet pipe 77 which has the communication 78 with the chamber 79 formed by said tank. In the equalizer 75 are the spaced spring ball checks 80 and 81, respectively, one being for the inlet side and the other for the exhaust or outlet side of said equalizer. This pipe 77 is connected with the main conduit 49, while a pipe 82 is connected with the leads 70, the tank being also fitted with an automatic relief valve 83 of any approved type.

About the pipes 70 for the passages 69 are the electric heating units 84 which are for the purpose of heating the air under pressure above a freezing temperature when delivered from the tank 71 to the cylinders 12.

Supported on the block 10 is an electric generator 85 which is driven from the shaft 34 through a belt 24 and this generator is included in an electric circuit which also has the heaters 84 so that these will operate from current furnished by said generator.

The storage tank 71 with the equalizer is so constructed that it is possible to pump air into the said tank with a tank pressure of two hundred pounds, while the compressors are only pumping against fifteen pounds or atmospheric pressure. Outside air pressure source can be coupled with the tank to augment that pressure derived from the cylinders 11 of the engine.

What is claimed is:

In a structure of the kind described, a V-shaped cylinder block provided with upwardly divergent cylinders, end heads fitted to said cylinders at opposite ends thereof, each head having valved inlets and outlets, a main outlet lead between the cylinders of the block for a storage tank and having lateral branches to the outlets at the inner sides of said heads, one inlet being located at the center of each head at the outer ends of said cylinders while the remaining inlets are at the outer sides of the heads at the inner ends of said cylinders, a substantially V-shaped crank case fitted to the block beneath the cylinders, a counterbalanced crank shaft journaled in the crank case, pistons operating in the cylinders and having rods extended into the crank case, crosshead guides fitted to the sides of said case interiorly thereof, crossheads connecting the rods with the guides and slidable on the same and connecting rods operated by the crank shaft and pivoted to the crossheads for reciprocation of the pistons.

BOB NEAL.